United States Patent
Morich et al.

(10) Patent No.: US 11,279,249 B2
(45) Date of Patent: Mar. 22, 2022

(54) METHOD AND CIRCUIT ARRANGEMENT FOR UNLOCKING A CHARGING PLUG IN AN EMERGENCY DESIGNED FOR A CHARGING STATION FOR CHARGING AN ELECTRIC ENERGY STORAGE OF AN ELECTRIC VEHICLE

(71) Applicant: Bender GmbH & Co. KG, Gruenberg (DE)

(72) Inventors: Lars Morich, Elz (DE); Steffen Freitag, Laubach (DE); Leonie Schleiter, Rosenthal (DE)

(73) Assignee: BENDER GMBH & CO. KG, Gruenberg (DE)

( * ) Notice: Subject to any disclaimer, the term of this patent is extended or adjusted under 35 U.S.C. 154(b) by 49 days.

(21) Appl. No.: 16/993,989

(22) Filed: Aug. 14, 2020

(65) Prior Publication Data

US 2021/0053454 A1    Feb. 25, 2021

(30) Foreign Application Priority Data

Aug. 20, 2019  (DE) ...................... 10 2019 122 377.6

(51) Int. Cl.
*B60L 53/30* (2019.01)
*B60L 53/62* (2019.01)
*B60L 53/16* (2019.01)

(52) U.S. Cl.
CPC .............. *B60L 53/30* (2019.02); *B60L 53/16* (2019.02); *B60L 53/62* (2019.02); *B60L 2270/32* (2013.01)

(58) Field of Classification Search
CPC .......... B60L 53/30; B60L 53/62; B60L 53/16; B60L 2270/32

(Continued)

(56) References Cited

U.S. PATENT DOCUMENTS 10,138,656 B2 * 11/2018 Dente ..................... E05B 81/14
2009/0082916 A1 * 3/2009 Tanaka .................... B60L 53/18
701/22

(Continued)

FOREIGN PATENT DOCUMENTS

CA    3065993 A1 *  6/2020
DE    102007002025 A1 *  7/2008 .............. B60L 53/16

(Continued)

OTHER PUBLICATIONS

Electric Vehicle Conductive Charging System; Part 23: DC electric vehicle charging station; Din En 61851-23; Nov. 2014; Germany.

(Continued)

*Primary Examiner* — Suresh Memula
(74) *Attorney, Agent, or Firm* — Dickinson Wright PLLC; Andrew D. Dorisio

(57) ABSTRACT

A method and a circuit arrangement for unlocking a charging plug in an emergency designed for a charging station for charging an electric energy storage of an electric vehicle, having a locking mechanism activated by an electric-motor drive unit. An emergency unlocking controller is a self-sufficient functional block in conjunction with a step-up converter for supplying the electric-motor drive unit with power, the input voltage of the step-up converter stepped up to the nominal voltage of the electric motor. A microcontroller controls and monitors the electric-motor drive unit and the step-up converter and for communicating with a superordinate locking controller generally disposed in the charging station. The step-up converter allows nearly the entire electric energy stored in the storage capacitor connected upstream of the step-up converter to be supplied to the electric-motor drive unit, whereby the motor can be operated at its required nominal voltage.

13 Claims, 1 Drawing Sheet

(58) Field of Classification Search
USPC .......................................................... 320/109
See application file for complete search history.

(56) References Cited

U.S. PATENT DOCUMENTS

| | | | | |
|---|---|---|---|---|
| 2010/0211643 | A1* | 8/2010 | Lowenthal | B60L 3/0069 709/206 |
| 2010/0227505 | A1* | 9/2010 | Markyvech | B60L 50/16 439/620.29 |
| 2010/0320966 | A1* | 12/2010 | Baxter | B60L 53/665 320/109 |
| 2011/0277516 | A1* | 11/2011 | Kahara | B60L 53/16 70/58 |
| 2011/0287649 | A1* | 11/2011 | Kurumizawa | B60L 53/68 439/304 |
| 2012/0088382 | A1* | 4/2012 | Konchan | B60L 53/16 439/153 |
| 2012/0098278 | A1* | 4/2012 | Proefke | B60L 53/16 292/144 |
| 2012/0135634 | A1* | 5/2012 | Gaul | B60L 53/16 439/488 |
| 2012/0234061 | A1* | 9/2012 | Inoue | B60L 53/68 70/255 |
| 2013/0023141 | A1* | 1/2013 | Meyer-Ebeling | H01R 13/639 439/324 |
| 2013/0106350 | A1* | 5/2013 | Ono | B60L 53/14 320/109 |
| 2013/0241482 | A1* | 9/2013 | Flack | H02J 7/0029 320/109 |
| 2013/0255333 | A1* | 10/2013 | Kurumizawa | E05B 83/28 70/237 |
| 2013/0260597 | A1* | 10/2013 | Kurumizawa | B60L 53/16 439/347 |
| 2013/0335021 | A1* | 12/2013 | Meier | B60L 53/30 320/109 |
| 2014/0042964 | A1* | 2/2014 | Arabia, Jr. | E05B 83/00 320/109 |
| 2014/0169865 | A1* | 6/2014 | Kurumizawa | B60L 3/04 403/322.1 |
| 2014/0217971 | A1 | 8/2014 | Wu | |
| 2014/0306816 | A1* | 10/2014 | Nakamura | B60L 53/16 340/457 |
| 2015/0015188 | A1* | 1/2015 | Ono | H02J 13/00034 320/107 |
| 2015/0240529 | A1* | 8/2015 | Dore Vasudevan | E05B 17/0091 70/277 |
| 2015/0329002 | A1* | 11/2015 | Broecker | B60L 58/12 320/109 |
| 2016/0137082 | A1* | 5/2016 | Jefferies | B60L 53/66 320/109 |
| 2019/0066416 | A1* | 2/2019 | Dhillon | G07F 15/005 |
| 2019/0210468 | A1* | 7/2019 | Wittl | H02J 7/00714 |
| 2019/0241093 | A1* | 8/2019 | Shimauchi | B60L 53/16 |
| 2020/0048935 | A1* | 2/2020 | Carpenter | E05B 47/026 |

FOREIGN PATENT DOCUMENTS

| | | | | |
|---|---|---|---|---|
| DE | 102009034887 | A1 | 2/2011 | |
| DE | 102009041874 | A1 * | 3/2011 | ............. B60L 53/64 |
| DE | 102011106504 | A1 | 12/2012 | |
| DE | 102012001396 | A1 | 8/2013 | |
| DE | 102014115019 | A1 | 4/2016 | |
| DE | 202019005575 | U1 * | 1/2021 | ............. B60L 3/003 |
| EP | 2750919 | A1 | 7/2014 | |
| EP | 2824794 | A1 | 1/2015 | |
| WO | 2014005623 | A1 | 1/2014 | |

OTHER PUBLICATIONS

Cam, Linda; Home charging station—easy control concept; ISSN 2193-892X; Apr. 2015; Germany.

Vogel, Dirk; Control for DC Charging Station from Phoenix Contact; Apr. 2019; Germany.

* cited by examiner

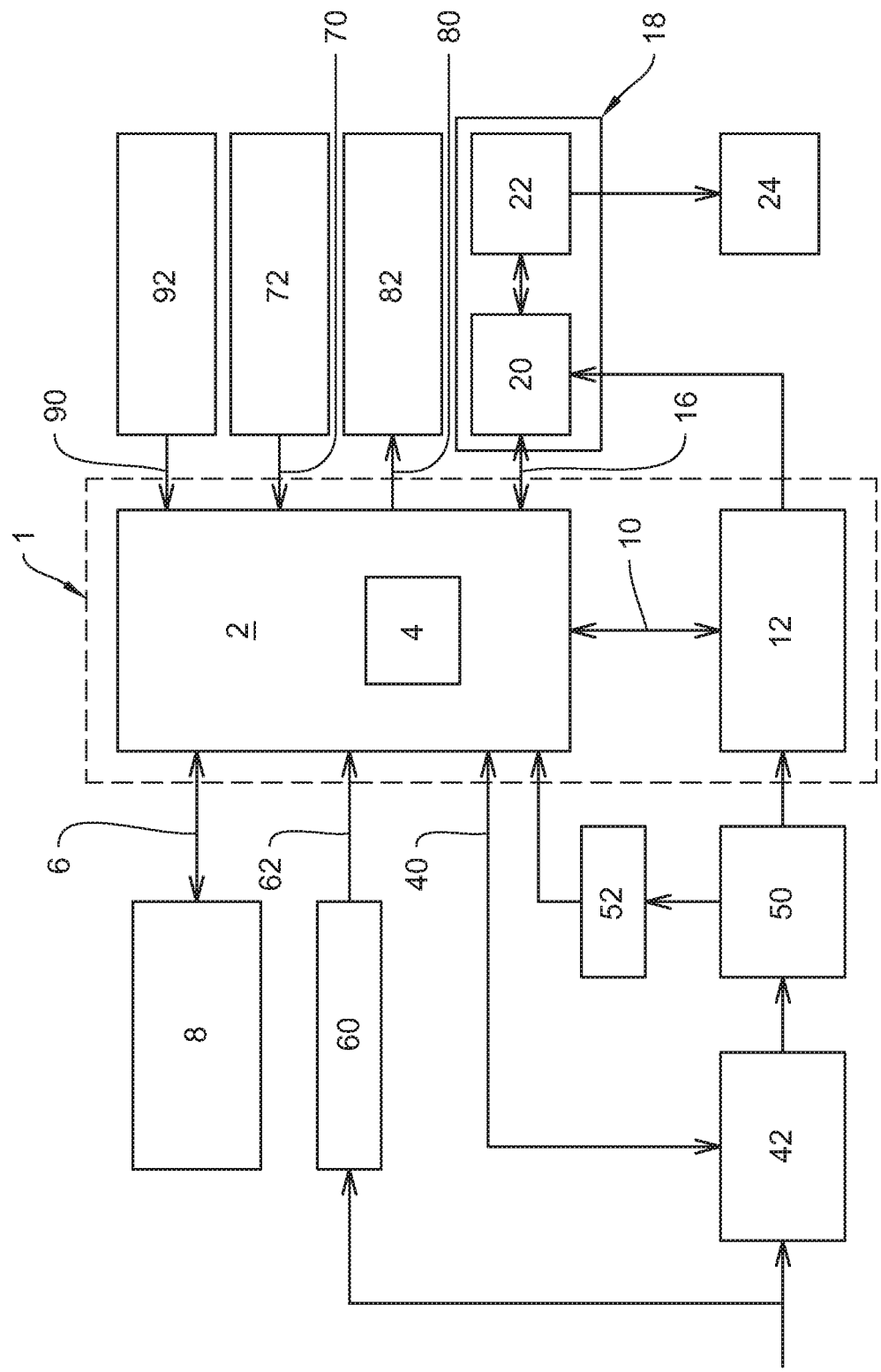

METHOD AND CIRCUIT ARRANGEMENT FOR UNLOCKING A CHARGING PLUG IN AN EMERGENCY DESIGNED FOR A CHARGING STATION FOR CHARGING AN ELECTRIC ENERGY STORAGE OF AN ELECTRIC VEHICLE

This application claims the benefit of German patent application no. 10 2019 122 377.6 filed on Aug. 20, 2019, the disclosure of which is incorporated by reference.

FIELD OF THE INVENTION

The invention relates to a method and a circuit arrangement for unlocking a charging plug in an emergency designed for a charging station for charging an electric energy storage of an electric vehicle, the charging station comprising a locking mechanism which is activated by an electric-motor drive unit.

BACKGROUND OF THE INVENTION

With increasing demand for electromobility, it has become necessary to regularly charge the electric energy storage of electric vehicles. For conductive charging, the electric vehicle is connected to a charging station via a charging cable. A charging plug disposed on the charging cable is inserted into a charging socket at the charging station and locked there. This is achieved by means of a locking mechanism which is disposed in the charging station and is activated by an electric-motor drive unit.

When an emergency unlocking takes place, e.g., during a power outage in the charging station, the electric motor which activates the locking mechanism must be switched on for several milliseconds (emergency operation). For this purpose, an electric capacitor in normal operation is charged till the nominal motor voltage has been reached, and a relay connects the charged capacitor to the electric-motor drive unit during a power outage or when the voltage is insufficient. During this process, the energy stored in the capacitor is discharged via the electric motor, meaning the capacitor voltage decreases accordingly. The electric motor is functional for as long as the applied voltage—depends on type—has not fallen below 75% of its nominal voltage. After, the energy stored in the capacitor is no longer converted to kinetic energy. Hitherto, a maximum of 50% of the stored energy could be converted to the required kinetic energy according to the state of the art. For the emergency unlocking to take place reliably, capacitors of large electric capacity are required—typically in the range of 20 mF to 50 mF—which has a negative impact.

A further disadvantage is that the contacts of the relay connecting the capacitor are subject to wear when switched on due to very high short-circuit currents and thus have only a limited service life.

Further disadvantages of the solutions to an emergency unlocking known from the state of the art are seen in the electric-motor drive unit being driven via two separate hardware motor controllers, one of which is activated during normal operation while the other is responsible for the emergency unlocking.

During known emergency unlockings when a malfunction arises, e.g., when a wrong charging status is transferred, a contactor which disconnects the charging current is not automatically switched off. Security monitoring of charging-station parameters, e.g., in Linux-based systems, is often only executed in a very sophisticated manner via a hardware implementation.

SUMMARY

The object of the invention at hand is therefore to present a method and a circuit arrangement for unlocking the charging plug in an emergency, both of which affect a low-wear and reliable unlocking in an emergency and are coincidentally efficient from a technological and economic viewpoint.

The fundamental idea of the invention at hand is based on the advantageous thought that an emergency unlocking controller is provided as a self-sufficient functional block in conjunction with a step-up converter for supplying power to the electric-motor drive unit, the input voltage of the step-up converter being stepped up to the nominal voltage of the electric motor.

The emergency unlocking controller comprises a microcontroller in particular for controlling and monitoring the electric-motor drive unit and for controlling and monitoring the step-up converter and for communicating with a superordinate locking controller generally disposed in the charging station.

The step-up converter causes nearly the entire electric energy stored in the storage capacitor connected upstream of the step-up converter to be supplied to the electric-motor drive unit, whereby the motor can be operated at its required nominal voltage. By using the step-up converter, the required amount of energy to be stored and thus the size and cost of the capacitor can be significantly reduced.

Moreover, by providing energy by means of the electronic step-up converter, fault-prone electromechanical components, such as relay contacts which can become stuck, are no longer required. Since the step-up converter provides power to the electric-motor drive unit during normal operation and emergency operation, a current limit of the starting current for the electric-motor drive unit can be set precisely for normal operation and emergency operation.

According to the invention, data is transferred between the emergency unlocking controller and the superordinate locking controller via a first communication interface. Locking or unlocking commands are sent to the emergency unlocking controller from the superordinate locking controller during normal operation, and the unlocking state is transferred to the superordinate locking controller from the emergency unlocking controller.

The step-up converter is controlled and monitored according to the invention via a second communication interface for transferring data between the emergency unlocking controller and the step-up converter.

According to the invention, the emergency unlocking controller takes up controlling and monitoring the electric-motor drive unit, including receiving a feedback signal from the electric-motor drive unit, via a third communication interface so that a power-outage condition can be tested, a security monitoring can be performed and a safety switch-off can take place.

To identify a condition for initiating emergency operation, the emergency unlocking controller evaluates a physical quantity in the form of a voltage signal or a power signal as an input signal.

If a condition for initiating emergency operation is identified by the emergency unlocking controller, then the emergency unlocking controller initiates unlocking the locking mechanism via the electric-motor drive unit.

In the emergency unlocking controller, not only the condition for initiating emergency operation is identified and the consequently required controller signals directed to the electric-motor drive unit and the step-up converter, but the emergency unlocking controller also takes over controlling and monitoring the electric-motor drive unit during normal operation. Owing to this, a second hardware component group is no longer required for controlling the electric-motor drive unit, which in turn reduces building space and cost.

According to another advantageous embodiment, the input signal is evaluated by detecting a line voltage of a power supply system for the charging station by means of a coupling circuit and by testing the line voltage by means of the emergency unlocking control, the locking mechanism being unlocked and a switch-off signal for a contactor being generated by isolating the electric vehicle from the charging station if, as a condition for initiating emergency operation, the detected line voltage deviates from a value prespecified in the superordinate locking controller or in the emergency unlocking controller.

For instance, the line voltage can be detected by monitoring the DC supply voltage or the AC supply voltage of the charging station/wall box and/or an outage of the line voltage is detected via an optocoupler as a coupling circuit. An outage of the line voltage is identified in the emergency unlocking control by a deviation from a nominal line voltage value specified indirectly by the superordinate locking controller (via the first communication interface) or directly by the emergency unlocking controller, for example by falling below the prespecified nominal line voltage threshold.

Upon identification of the outage of the line voltage, a switch-off signal for a contactor is moreover generated via an emergency switch-off signal output for isolating the electric vehicle from the charging station.

Furthermore, data is transferred between the emergency unlocking controller and the power supply module of the charging station by means of a fourth communication interface.

This fourth communication interface allows the emergency unlocking controller to control and monitor the power supply module and thus to control the power management of a charge controller of the charging station.

In the emergency unlocking controller according to another advantageous embodiment, a temperature is monitored via a temperature signal input of the emergency unlocking controller and a switch-off signal for a contactor is generated via an emergency switch-off signal output if a violation in the temperature threshold is determined.

The emergency unlocking controller therefore comprises a temperature-signal input, a temperature threshold being specified directly by the emergency unlocking controller, or being stored in the superordinate locking controller and transferred to the emergency unlocking controller via the first communication interface.

Ergo, the emergency unlocking controller can ensure safe electrical isolation of the charging plug by controlling the contactor upon unlocking in an emergency without aid from the superordinate locking controller.

Furthermore, monitoring charging-station parameters via a monitoring-signal input of the emergency unlocking controller and generating a switch-off signal for a contactor are both executed as additional functions of the emergency unlocking controller should the charging-station parameters signalize a faulty state of the charging station.

In the scope of fault monitoring, when a charge fault arises, such as a wrong charging current via the charging cable, the contactor can thus be switched by means of the switch-off signal for a contactor or the control pilot (CP), and the contactor is switched via the switch-off signal for a contactor when a fault arises (faulty charging status or faulty pulse width modulation signal (PWM)).

It is also conceivable to monitor the data (measurement data) generated by measuring a charging current and to switch the contactor via the switch-off signal for a contactor when a fault arises (too high current values, faulty voltage, wrong rotating field, wrong L conductor). In the case of monitoring the measurement data, activating emergency operation, i.e., unlocking the locking mechanism, is optional and is parametrized by the superordinate locking controller or the emergency unlocking controller.

A switch-off signal for a contactor is therefore always triggered by the emergency unlocking controller when one of the switch-off conditions for emergency operation has been fulfilled after identifying a change in line voltage, in particular a line-voltage outage, a violation of the temperature threshold or a fault identified and evaluated as a fault via the monitoring-signal input.

With advantage, the electric energy stored in a storage capacitor of the power supply module is used during emergency operation.

During emergency operation, the (residual) energy of the entire system of the charging station, in particular the electric energy stored in a storage capacitor of the power supply module, is used for executing the emergency operation.

In another advantageous embodiment, a self-sufficient supply voltage is provided for the emergency unlocking controller by means of a self-sufficient power supply supplied by an energy storage. The self-sufficient power supply can, for example, be realized as a fixed voltage controller which provides a (self-sufficient) supply voltage for the emergency unlocking controller.

By executing the method steps, the object of the invention is further attained by a circuit arrangement for unlocking a charging plug in an emergency as designed for a charging station.

As it is, the technological effects described above and the advantages resulting therefrom also apply to the device features of the circuit arrangement.

The circuit arrangement according to the invention comprises an emergency unlocking controller having a microcontroller and a step-up converter.

The microcontroller is configured such that it executes the method steps conducted in the emergency unlocking controller, in particular the steps of evaluating a physical quantity as an input signal for identifying emergency operation, transferring data between the emergency unlocking controller and a superordinate locking controller, controlling and monitoring the step-up converter and controlling and monitoring the electric-motor drive unit.

Advantageously, the microcontroller is further configured to transfer data between the emergency unlocking controller and a power supply module of the charging station, including controlling and monitoring the power supply module, as well as to monitor a temperature, to monitor charging-station parameters and to generate a switch-off signal for a contactor.

BRIEF DESCRIPTION OF THE FIGURE

Further advantageous embodiment features are derived from the following description and the drawing which describes a preferred embodiment of the invention using an example. In the figures is shown a functional block diagram of the circuit arrangement according to the invention for emergency unlocking.

Fig. shows the functional interaction of circuit arrangement 1 according to the invention for emergency unlocking with further functional blocks of a charging station for charging an electric energy storage of an electric vehicle.

DETAILED DESCRIPTION

Circuit arrangement 1 comprises an emergency unlocking controller 2 which comprises a microcontroller 4. Emergency unlocking controller 2 further comprises a first communication interface 6 for transferring data using a superordinate locking controller 8. Besides the locking or unlocking commands received during normal operation from superordinate unlocking controller 8, emergency unlocking controller 2 can receive the following optional commands: specifications or different electric motors with motor parameters (controller times, current limitation), updates for the unlocking controller, activated/deactivated emergency unlocking, temperature thresholds and receipts for different temperature situations.

Besides transferring the locking state (locked/unlocked), diagnosis values such as electric voltages of the motor, supply voltages or intermediate voltages, temperatures or switching operations can optionally be transferred as data to superordinate locking controller 8 via first communication interface 6 during normal operation.

In addition, circuit arrangement 1 comprises a step-up converter 12 which supplies power to an electric-motor drive unit 18 during normal operation and emergency operation.

For communicating with step-up converter 12, emergency unlocking controller 2 comprises a second communication interface 10. Via this second communication interface 10, step-up converter 12 is controlled and monitored by microcontroller 4 disposed in emergency unlocking controller 2, step-up converter 12 being switched on and off and its input and output voltage and output current being determined.

A third communication interface 16 of emergency unlocking controller 2 controls and monitors electric-motor drive unit 18 during normal and emergency operation. For this purpose, microcontroller 4 disposed in emergency unlocking controller 2 controls a motor driver 20 of electric-motor drive unit 18. An electric motor 22 of electric-motor drive unit 18 activates locking mechanism 24 according to the commands of microcontroller 4.

Emergency unlocking controller 2 further comprises a fourth communication interface 40 for transferring data between emergency unlocking controller 2 and a power supply module 42 of the charging station. Via this fourth communication interface 40, voltage interruptions and thus an emergency operation can be identified, and if necessary, systems of a charging control device can be switched off appropriately via power supply module 42 to save energy in the entire system. A present residual energy, for example from power supply module 42, is then available for an energy storage 50 (cf. below) in addition. Thus, emergency unlocking controller 2 can also be used for the power management of the entire charge control.

An energy storage 50—in this instance illustrated as a separate energy storage 50 which can also be a component of power supply module 42—provides the energy to step-up converter 12 and to a self-sufficient power supply 52 of emergency unlocking controller 2.

Via a coupling circuit 60, a physical quantity is evaluated as an input signal by testing a line voltage of a power supply system supplying the charging station with power. For this purpose, microcontroller 4 can test a DC supply voltage or AC supply voltage of the charging station/wall box, for example, to identify a condition for initiating emergency operation.

Further features of emergency unlocking controller 2 are a temperature-signal input 70 for receiving a temperature signal from a temperature sensor 72.

Analogously, signals from monitoring devices 92 for monitoring charging-station parameters, such as charge-state parameters or consumer measuring data, can be received via a monitoring-signal input 90.

Via an emergency switch-off signal output 80, (switch) contactor 82 is switched off in emergencies—for example during a line voltage outage, a temperature threshold has been violated or when data, e.g., charge-state parameters or faulty data of the consumption measurement, received via the monitoring-signal input 90 is faulty.

The invention claimed is:

1. A method for unlocking a charging plug in an emergency designed for a charging station for charging an electric energy storage of an electric vehicle, the charging station comprising a locking mechanism (24) which is activated by an electric-motor drive unit (18), the method comprising the steps of:
   providing a power supply for the electric-motor drive unit (18) during normal operation and emergency operation by means of a step-up converter (12),
   evaluating a physical quantity as an input signal (62) for identifying a condition for initiating emergency operation by means of an emergency unlocking controller (2),
   transferring data between the emergency unlocking controller (2) and a superordinate locking controller (8),
   controlling and monitoring the step-up converter (12) by means of the emergency unlocking controller (2),
   controlling and monitoring the electric-motor drive unit (18) during normal operation and emergency operation by means of the emergency unlocking controller (2), the locking mechanism (24) being unlocked during emergency operation via the electric-motor drive unit (18).

2. The method according to claim 1, wherein the input signal is evaluated by detecting a line voltage of a power supply system, which supplies the charging station with power, by means of a coupling circuit (60) and by testing the line voltage by means of the emergency unlocking controller (2), the locking mechanism (24) being unlocked and a switch-off signal for a contactor being generated for isolating the electric vehicle from the charging station if the detected line voltage deviates from a value prespecified in the superordinate locking controller (8) or in the emergency unlocking controller (2) as a condition for initiating the emergency operation.

3. The method according to claim 1, further including transferring data between the emergency unlocking controller (2) and a power supply module (42) of the charging station.

4. The method according to claim 3, wherein the emergency unlocking controller (2) controls and monitors the power supply module (42).

5. The method according to claim 1, further including:
   monitoring a temperature via a temperature-signal input (70); and
   generating a switch-off signal for a contactor should a violation of a temperature threshold have been determined.

6. The method according to claim 1, further including:
monitoring charging-station parameters via a monitoring-signal input (90); and
generating a switch-off signal for a contactor should the charging-station parameters signalize a faulty state of the charging station.

7. The method according to claim 1, wherein the electric energy stored in a storage capacitor of the power-supply module (42) is used during emergency operation.

8. The method according to claim 1, further including providing a self-sufficient supply voltage for the emergency unlocking controller (2) by means of a self-sufficient power supply (52) supplied with energy by an energy storage (50).

9. A circuit arrangement (1) for unlocking a charging plug in an emergency designed for a charging station for charging an electric energy storage of an electric vehicle, the charging station comprising:
a locking mechanism (24), which is activated via an electric-motor drive unit (18), the circuit arrangement (1) comprising an emergency unlocking controller (2) having a microcontroller (4) which is configured for executing the method steps according to claim 1 taking place in the emergency unlocking controller (2),
a step-up converter (12),
a first communication interface (6) for transferring data between the emergency unlocking controller (2) and a superordinate locking controller (8),
a second communication interface (20) for transferring data between the emergency unlocking controller (2) and the step-up converter (12), and
a third communication interface (16) for transferring data between the emergency unlocking controller (2) and the electric-motor drive unit (18).

10. The circuit arrangement according to claim 9, further including a coupling circuit (60) for detecting a line voltage of a power supply system supplying the charging station with power.

11. The circuit arrangement according to claim 9, wherein the emergency unlocking controller (2) further comprises a fourth communication interface (40) for transferring data between the emergency unlocking controller (2) and a power supply module (42) of the charging station.

12. The circuit arrangement according to claim 9, wherein the emergency unlocking controller comprises a temperature-signal input (70) for temperature monitoring,
an emergency switch-off signal output (80) for the emergency switch-off of a circuit contactor (82) during an emergency unlocking, and
a monitoring-signal input (90) for monitoring charging-station parameters.

13. The circuit arrangement according to claim 9, further including a self-sufficient power supply (52), which is supplied with power by an energy storage (50), for providing a self-sufficient supply voltage for the emergency unlocking controller (2).

* * * * *